(12) United States Patent
Urakawa et al.

(10) Patent No.: US 8,735,499 B2
(45) Date of Patent: May 27, 2014

(54) PROPYLENE-BASED POLYMER COMPOSITION AND USES THEREOF

(75) Inventors: Naomi Urakawa, Tokyo (JP); Makoto Nakano, Chiba (JP); Yasuhiro Kitahara, Kawasaki (JP); Ryosuke Aburaki, Ichihara (JP); Akihiro Matsuda, Yokohama (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 13/536,590

(22) Filed: Jun. 28, 2012

(65) Prior Publication Data

US 2013/0137826 A1   May 30, 2013

Related U.S. Application Data

(60) Provisional application No. 61/529,791, filed on Aug. 31, 2011.

(30) Foreign Application Priority Data

Jun. 29, 2011   (JP) .................................. 2011-144364

(51) Int. Cl.
    *C08F 8/00* (2006.01)
    *C08L 9/00* (2006.01)
    *C08L 23/10* (2006.01)
    *C08L 25/02* (2006.01)

(52) U.S. Cl.
    USPC ............ 525/191; 525/232; 525/240; 525/241

(58) Field of Classification Search
    USPC .................................. 525/191, 232, 240, 241
    See application file for complete search history.

(56) References Cited

U.S. PATENT DOCUMENTS

| | | | | |
|---|---|---|---|---|
| 5,525,675 | A | * | 6/1996 | Masuda et al. ................. 525/194 |
| 5,753,762 | A | * | 5/1998 | Leuckx et al. ................. 525/240 |
| 7,388,051 | B2 | * | 6/2008 | Mori et al. ..................... 525/240 |
| 7,488,789 | B2 | | 2/2009 | Ikenaga et al. |
| 2007/0251572 | A1 | | 11/2007 | Hoya et al. |
| 2008/0220193 | A1 | | 9/2008 | Tohi et al. |
| 2010/0285325 | A1 | | 11/2010 | Hoya |

FOREIGN PATENT DOCUMENTS

| | | |
|---|---|---|
| JP | 2001-287305 | 10/2001 |
| JP | 2002-097325 | 4/2002 |
| JP | 2003-147135 | 5/2003 |
| JP | 2008-169316 | 7/2008 |
| JP | 2010-111822 | 5/2010 |
| JP | 2010-144007 | 7/2010 |
| JP | 2010-189474 | 9/2010 |
| JP | 2010-189475 | 9/2010 |
| WO | WO-2004/087775 A1 | 10/2004 |
| WO | WO-2006/057361 A1 | 6/2006 |
| WO | WO-2006/123759 A1 | 11/2006 |
| WO | WO-2008/059895 A1 | 5/2008 |
| WO | WO-2009/084517 A1 | 7/2009 |

OTHER PUBLICATIONS

A. Eckstein et al., "Determination of Plateau Moduli and Entanglement Molecular Weights of Isotactic, Syndiotactic, and Atactic Polypropylenes Synthesized with Metallocene Catalysts", Macromolecules, Feb. 24, 1998, pp. 1335-1340, vol. 31, No. 4.

* cited by examiner

*Primary Examiner* — Nathan M Nutter
(74) *Attorney, Agent, or Firm* — Foley & Lardner LLP

(57) ABSTRACT

The propylene-based polymer composition includes a specific amount of a propylene-based polymer (A) having a syndiotactic pentad fraction (rrrr fraction) of 85% or more and containing 90 to 100 mol % of a structural unit derived from propylene; a specific amount of a propylene-based copolymer (B) containing 40 to 89 mol % of a structural unit derived from propylene and 11 to 60 mol % of a structural unit derived from an α-olefin and satisfying a specific equation of intrinsic viscosity [η] and MFR; and specific amount(s) of at least one polymer of an olefin-based thermoplastic elastomer (C), a styrene-based elastomer (D), a propylene/ethylene/α-olefin copolymer (E) and an isotactic propylene-based polymer (F), and optionally an ethylene/vinyl acetate copolymer (G) and/or an ethylene-based polymer (H).

28 Claims, No Drawings

PROPYLENE-BASED POLYMER COMPOSITION AND USES THEREOF

TECHNICAL FIELD

The present invention relates to a propylene-based polymer composition excellent in abrasion resistance and suitable for uses including a sheet for artificial leathers. The present invention also relates to an article, a sheet, a film, a laminate and an artificial leather.

BACKGROUND ART

Olefin-based artificial leathers (olefin leathers) are used in various uses including stationery, various cases, packages, furniture, building materials and automotive interiors. As a soft olefin-based resin used in such olefin-based artificial leathers, an olefin-based thermoplastic elastomer, a styrene-based thermoplastic elastomer, an ethylene-vinyl acetate copolymer, an ethylene-methacrylic acid copolymer and the like are known. However, the olefin-based artificial leather obtained by using such a soft olefin-based resin has a problem that it is insufficient in abrasion resistance.

In order to improve abrasion resistance, for example, a method is proposed to obtain a laminate in which a fabric layer is provided on a skin layer of a soft olefin-based resin layer (Patent Document 1). This method, however, may involve many steps and high cost. In general, an olefin-based resin rich in flexibility has poor abrasion resistance, and thus a resin composition having abrasion resistance is difficult to obtain therefrom. Thus, a material that is a soft olefin-based resin but is excellent in abrasion resistance is still demanded.

CITATION LIST

Patent Document

Patent Document 1: JP-A-2001-287305

SUMMARY OF THE INVENTION

Technical Problem

It is an object of the present invention to obtain a propylene-based polymer composition that is an olefin-based soft resin but is excellent in abrasion resistance. It is another object of the present invention to obtain various articles such as artificial leathers using the composition.

Technical Solution

The propylene-based polymer composition of the present invention is a propylene-based polymer composition comprising the following polymers:

1 to 35 parts by mass of a propylene-based polymer (A) having a syndiotactic pentad fraction (rrrr fraction) as measured by $^{13}$C-NMR of 85% or more and containing 90 to 100 mol % of a structural unit derived from propylene; and 5 to 95 parts by mass of a propylene-based copolymer (B) containing 40 to 89 mol % of a structural unit derived from propylene and 11 to 60 mol % of a structural unit derived from an α-olefin having 2 to 20 carbon atoms and satisfying the following requirement (b4):

(b4) the intrinsic viscosity [η] (dl/g) as measured in decalin at 135° C. and the MFR (g/10 min) as measured at 230° C. under a load of 2.16 kg satisfy the following equation:

$$1.50 \times MFR^{(-0.20)} \leq [\eta] \leq 2.65 \times MFR^{(-0.20)}.$$

In addition to (A) and (B), the propylene-based polymer composition comprises at least one of the following polymers (C) to (F), and optionally comprises a polymer (G) and/or a polymer (H) in a range described below, wherein the total amount of the polymers (C) to (H) is 1 to 94 parts by mass, provided that the total amount of the polymers (A) to (H) is 100 parts by mass:

0 to 94 parts by mass of a non-crosslinked or partially-crosslinked olefin-based thermoplastic elastomer (C);

0 to 94 parts by mass of a styrene-based elastomer (D);

0 to 94 parts by mass of a propylene/ethylene/α-olefin having 4 to 20 carbon atoms copolymer (E) having an isotactic triad fraction (mm fraction) of 85% or more and containing 40 to 85 mol % of a structural unit derived from propylene, 5 to 30 mol % of a structural unit derived from ethylene and 5 to 30 mol % of a structural unit derived from an α-olefin having 4 to 20 carbon atoms;

0 to 49 parts by mass of an isotactic propylene-based polymer (F);

0 to 60 parts by mass of an ethylene/vinyl acetate copolymer (G); and 0 to 60 parts by mass of an ethylene-based polymer (H) having a density of 850 to 930 kg/m$^3$.

Advantageous Effect of the Invention

The propylene-based polymer composition of the present invention, in spite of being an olefin-based soft resin, is excellent in abrasion resistance, and therefore is employable for various kinds of articles.

DESCRIPTION OF EMBODIMENTS

<Propylene-Based Polymer (A)>

The propylene-based polymer (A), which is a polymer component contained in the propylene-based polymer composition of the present invention, is a propylene-based polymer that has a syndiotactic pentad fraction (rrrr fraction) as measured by $^{13}$C-NMR of 85% or more, preferably 90% or more, more preferably 93% or more, still more preferably 94% or more, and contains 90 to 100 mol %, preferably 92 to 100 mol %, more preferably 95 to 100 mol %, of a structural unit derived from propylene.

The propylene-based polymer (A) having rrrr fraction in the above range is excellent in moldability, heat resistance and transparency, and provides a crystalline polypropylene with superior properties. The use of the propylene-based polymer (A) causes inhibited crystallization and micro-spherulitization, and thus allows the resultant propylene-based polymer composition of the present invention to have high transparency and surface gloss.

The use as the propylene-based polymer (A) according to the present invention of the propylene-based polymer with the above range provides a propylene-based polymer composition particularly excellent in heat resistance.

The syndiotactic pentad fraction (rrrr fraction) of the propylene-based polymer (A) according to the present invention is measured in such a manner as described below.

The rrrr fraction is determined from Prrrr (absorption intensity assigned to the methyl group of the third unit in a site where five continuous propylene units are syndiotactically bonded) and Pw (absorption intensity assigned to all the methyl groups of propylene units), in $^{13}$C-NMR spectrum, using the following equation (1).

$$rrrr \text{ fraction}(\%) = 100 \times Prrrr/Pw \tag{1}$$

The NMR measurement is performed, for example, in the following manner: 0.35 g of a sample is dissolved in 2.0 mL of hexachlorobutadiene with heating; the resultant solution is filtered through a glass filter (G2), and the filtrate, to which 0.5 mL of deuterated benzene is added, is introduced to a NMR tube of 10 mm in internal diameter; and $^{13}$C-NMR measurement is performed at 120° C. using a GX-500 NMR measurement apparatus manufactured by JEOL Ltd., with an accumulation of 8,000 or more times.

The propylene-based polymer (A) according to the present invention is, for example, a propylene homopolymer, or a copolymer of propylene and an α-olefin having 2 to 20 carbon atoms. Examples of the α-olefin include ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. The α-olefin is preferably ethylene or an α-olefin having 4 to 10 carbon atoms. One kind of α-olefin or two or more kinds of α-olefins may be copolymerized with propylene.

The propylene-based polymer (A) according to the present invention is preferably a propylene-based polymer that has a quantity of heat of fusion ($\Delta H_c$) as measured by differential scanning calorimetry (DSC) of 20 J/g or more, more preferably 40 J/g or more, still more preferably 50 J/g or more. The upper limit of the quantity of heat of fusion ($\Delta H_c$), which is not particularly limited, is usually not more than 120 J/g.

The propylene-based polymer (A) according to the present invention preferably has a melting point (Tm) as measured by differential scanning calorimetry (DSC) of 145° C. or higher, more preferably 147° C. or higher, still more preferably 150° C. or higher, particularly preferably 155° C. or higher. The upper limit of Tm, which is not particularly limited, is usually e.g., 170° C. or lower. The propylene-based polymer (A) having a melting point (Tm) in the above range is excellent in moldability, heat resistance and mechanical properties.

The propylene-based polymer (A) according to the present invention preferably has an intrinsic viscosity [η] as measured in 135° C. decalin of 0.5 to 10 dl/g, more preferably 1.0 to 6 dl/g, still more preferably 1.0 to 4 dl/g. The propylene-based polymer (A) having an intrinsic viscosity in the above range shows good fluidity, is easy to blend with another component, and the resultant propylene-based polymer composition tends to give an article excellent in mechanical strength.

The MFR of the propylene-based polymer (A) according to the present invention is not particularly limited as long as the propylene-based polymer composition obtained by containing the propylene-based polymer (A) has molding processability, but the propylene-based polymer (A) usually has MFR as measured at 230° C. under a load of 2.16 kg of 0.001 to 50 g/10 min, preferably 0.1 to 30 g/10 min, more preferably 0.1 to 10 g/10 min.

<Production Process of Propylene-Based Polymer (A)>

The propylene-based polymer (A) according to the present invention may be obtained by various known production processes, for example, a production process described in WO2006/123759.

<Propylene-Based Copolymer (B)>

The propylene-based copolymer (B), which is a polymer component contained in the propylene-based polymer composition of the present invention, is a propylene-based copolymer that contains 40 to 89 mol %, preferably 50 to 89 mol %, more preferably 55 to 89 mol %, of a structural unit derived from propylene and 11 to 60 mol %, preferably 11 to 50 mol %, more preferably 11 to 45 mol %, of a structural unit derived from an α-olefin having 2 to 20 carbon atoms excluding propylene, provided that the total amount of the structural unit derived from propylene and the structural unit derived from an α-olefin having 2 to 20 carbon atoms excluding propylene is 100 mol %, and satisfies the following requirement (b4):

(b4) the intrinsic viscosity [η] (dl/g) as measured in decalin at 135° C. and the MFR (g/10 min) as measured at 230° C. under a load of 2.16 kg satisfy the following equation (2), preferably the following equation (3).

$$1.50 \times MFR^{(-0.20)} \leq [\eta] \leq 2.65 \times MFR^{(-0.20)} \quad (2)$$

$$1.80 \times MFR^{(-0.20)} \leq [\eta] \leq 2.50 \times MFR^{(-0.19)} \quad (3)$$

The propylene-based polymer (B) satisfying the equation (2), preferably the equation (3) as the requirement (b4), shows a smaller MFR than a conventional isotactic propylene-based copolymer when the intrinsic viscosity [η] is the same.

As described in Macromolecules 31, 1335-1340 (1998), this is considered to be attributed to the difference in entanglement molecular weight between an isotactic polypropylene (Me is described as being 6900 (g/mol) in this thesis) and a syndiotactic polypropylene (Me is described as being 2170 (g/mol) in this thesis). It is thus considered that when the [η] is the same, a material having a syndiotactic structure has increased entanglement than a material having an isotactic structure and consequently shows a smaller MFR.

As described above, the propylene-based polymer satisfying the equation (2) as the requirement (b4) is considered to be a polymer having a stereoregularity different from a propylene-based polymer having an isotactic structure, namely having so-called a syndiotactic structure. In this case, the resultant propylene-based polymer composition is excellent in abrasion resistance.

The propylene-based copolymer (B) according to the present invention is, for example, a copolymer of propylene and an α-olefin having 2 to 20 carbon atoms. Examples of the α-olefin include ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. The α-olefin is preferably ethylene or an α-olefin having 4 to 10 carbon atoms. One kind of α-olefin or two or more kinds of α-olefins may be copolymerized with propylene.

The propylene-based copolymer (B) according to the present invention is preferably a propylene-based copolymer that has a quantity of heat of fusion ($\Delta H_B$) as measured by differential scanning calorimetry (DSC) of not more than 10 J/g, more preferably not more than 5 J/g, still more preferably not more than 1 J/g.

The propylene-based copolymer (B) according to the present invention is preferably a polymer that has a melting point as measured by differential scanning calorimetry (DSC) of lower than 90° C., more preferably 80° C. or lower, still more preferably has no melting point. In the present invention, a polymer having "no melting point" has a quantity of heat of fusion ΔH due to melting peak being not more than 1 J/g.

The MFR of the propylene-based copolymer (B) according to the present invention is not particularly limited as long as the propylene-based copolymer (B) satisfies the requirement (b4) and the propylene-based polymer composition obtained by containing the propylene-based copolymer (B) has molding processability, but the propylene-based copolymer (B) usually has MFR as measured at 230° C. under a load of 2.16 kg of 0.01 to 100 g/10 min, preferably 0.01 to 50 g/10 min, more preferably 0.1 to 30 g/10 min, particularly preferably 0.1 to 10 g/10 min.

The intrinsic viscosity [η] of the propylene-based copolymer (B) according to the present invention is not particularly limited as long as the propylene-based copolymer (B) satisfies the requirement (b4), but the propylene-based copolymer (B) according to the present invention usually has an intrinsic viscosity [η] as measured in decalin at 135° C. of 0.01 to 10 dl/g, preferably 0.05 to 10 dl/g, more preferably 0.1 to 5 dl/g. By using the propylene-based polymer (B) having an intrinsic viscosity in the above range, the resultant propylene-based polymer composition shows excellent fluidity during molding operation, and the resultant article is excellent also in terms of mechanical properties.

The propylene-based polymer (B) according to the present invention usually has Mw/Mn as measured by GPC in terms of polystyrene of 1.2 to 3.5, more preferably 1.5 to 3.0.

The propylene-based copolymer (B) according to the present invention may have a specific syndiotactic triad fraction (rr fraction) as measured by $^{13}$C-NMR, as shown below. The propylene-based copolymer (B) preferably has rr fraction of 40% or more, more preferably 45% or more.

The rr fraction is determined from Prr (absorption intensity assigned to the methyl group of the second unit in a site where three continuous propylene units are syndiotactically bonded) and Pw (absorption intensity assigned to all the methyl groups of propylene units), in $^{13}$C-NMR spectrum, using the following equation (4).

$$rr \text{ fraction}(\%) = 100 \times Prr/Pw \tag{4}$$

In determining the rr fraction, when absorptions assigned to comonomers overlap absorption assigned to mr (absorption that is assigned to at least both syndiotactic bonding and isotactic bonding in three propylene units and is used to determine Pmr (absorption intensity)); absorption assigned to rr (absorption that is assigned to the methyl group of the second unit in three continuous syndiotactically-bonded propylene units and is used to determine Prr (absorption intensity)); or absorption assigned to mm (absorption that is assigned to the methyl group of the second unit in three continuous isotactically-bonded propylene units and is used to determine Pmm (absorption intensity)), the rr fraction is calculated without deducting contribution of the comonomer components.

Specifically, paragraphs [0018] to [0031] of JP-A-2002-097325 describing how to determine the "syndiotacticity parameter (SP value)" are referred to and in accordance with assignments described from the paragraphs [0018] to [0023], the rr fraction is calculated based on the accumulated intensities of signals in the first region, the second region and the third region, using the equation (4).

NMR measurement to determine the rr fraction is performed, for example, in the following manner: 0.35 g of a sample is dissolved in 2.0 mL of hexachlorobutadiene with heating; the solution is filtered through a glass filter (G2), and the filtrate, to which 0.5 mL of deuterated benzene is added, is introduced to a NMR tube of 10 mm in internal diameter; and $^{13}$C-NMR measurement is performed at 120° C. using GX-400 NMR apparatus manufactured by JEOL, Ltd., with an accumulation of 8,000 or more times.

The rr fraction defined above is a parameter to indicate that the component (B) contains a larger proportion of a so-called syndiotactic structure, and a parameter that has a meaning similar to the fact that the component (B) satisfies the aforementioned equations of the requirement (b4).

The propylene-based polymer (B) according to the present invention is desirably a propylene/ethylene/α-olefin having 4 to 20 carbon atoms copolymer (B1) that contains:

a structural unit derived from propylene, for example, in an amount of 40 to 89 mol %, preferably 50 to 89 mol %, more preferably 55 to 80 mol %;

a structural unit derived from ethylene, for example, in an amount of 1 to 35 mol %, preferably 1 to 30 mol %, more preferably 5 to 20 mol %; and a structural unit derived from an α-olefin having 4 to 20 carbon atoms, for example, in an amount of 10 to 45 mol %, preferably 10 to 40 mol %, more preferably 15 to 40 mol %, provided that the total amount of the structural unit derived from propylene, the structural unit derived from ethylene and the structural unit derived from an α-olefin having 4 to 20 carbon atoms is 100 mol %.

In this case, the ratio (mol %) (Pb2-2) of the content of the structural unit derived from an α-olefin having 4 to 20 carbon atoms to the total amount of the structural unit derived from propylene, the structural unit derived from ethylene and the structural unit derived from an α-olefin having 4 to 20 carbon atoms, and the ratio (mol %) (Pb2-1) of the content of the structural unit derived from ethylene to the total amount of the structural unit derived from propylene, the structural unit derived from ethylene and the structural unit derived from an α-olefin having 4 to 20 carbon atoms preferably satisfy the relationship: (Pb2-2)>(Pb2-1), more preferably the relationship: (Pb2-2)−(Pb2-1)≥1 mol % or more.

The propylene-based polymer (B) according to the present invention, other than the propylene/ethylene/α-olefin having 4 to 20 carbon atoms copolymer (B1), may be a propylene/ethylene copolymer (B2) that contains a structural unit derived from propylene, for example, in an amount of 50 to 89 mol %, preferably 55 to 89 mol %, more preferably 65 to 85 mol %; and a structural unit derived from ethylene, for example, in an amount of 11 to 50 mol %, preferably 11 to 45 mol %, more preferably 15 to 35 mol %, provided that the total amount of the structural unit derived from propylene and the structural unit derived from ethylene is 100 mol %. When the copolymer (B1) and the copolymer (B2) are compared with each other, the propylene/ethylene/α-olefin copolymer (B1) is preferable.

<Production Process of Propylene-Based Polymer (B)>

The propylene-based polymer (B) according to the present invention may be produced by various known production processes. For example, the propylene-based polymer (B) may be produced by copolymerizing propylene and an α-olefin with a catalyst capable of producing a syndiotactic propylene. More specifically, for example, the propylene-based polymer (B) may be produced by a process described in WO2008-059895; however, the production process is not limited thereto.

<Olefin-Based Thermoplastic Elastomer (C)>

The olefin-based thermoplastic elastomer (C), which is a polymer component that may be contained in the propylene-based polymer composition of the present invention, is a non-crosslinked or partially-crosslinked olefin-based thermoplastic elastomer, and preferably comprises a crystalline polyolefin (C2-1) such as polypropylene and an α-olefin-based copolymer rubber (C2-2).

The MFR of the olefin-based thermoplastic elastomer (C) according to the present invention is not particularly limited as long as the propylene-based polymer composition obtained by containing the olefin-based thermoplastic elastomer (C) has molding processability, but the olefin-based thermoplastic elastomer (C) usually has MFR as measured at 230'C under a load of 10 kg of 0.001 to 100 g/10 min, preferably 0.01 to 80 g/10 min.

The olefin-based thermoplastic elastomer (C) according to the present invention may comprise, in addition to the crystalline polyolefin (C2-1) and the α-olefin-based copolymer rubber (C2-2) described later, a softener (C2-3) and/or an inorganic filler (C2-4) as an optional component.

As the softener (C2-3), a softener commonly used for a rubber is employable. Specific examples thereof include:

petroleum-based substances such as process oil, lubricating oil, paraffin, liquid paraffin, petroleum asphalt and vaseline;

coal tars such as coal tar and coal tar pitch;

fatty oils such as castor oil, linseed oil, rapeseed oil, soybean oil and coconut oil;

waxes such as tall oil, beeswax, carnauba wax and lanolin;

fatty acids or metallic salts thereof such as ricinolic acid, palmitic acid, stearic acid, barium stearate and calcium stearate;

synthetic high-molecular substances such as petroleum resin, coumarone-indene resin and atactic polypropylene;

ester-based plasticizers such as dioctyl phthalate, dioctyl adipate and dioctyl sebacate; and others such as microcrystalline wax, factice, liquid polybutadiene, modified liquid polybutadiene and liquid thiokol.

The softener (C2-3) is usually used in an amount of not more than 200 parts by mass, preferably 2 to 100 parts by mass, based on 100 parts by mass of the total amount of the crystalline polyolefin resin (C2-1) and the α-olefin-based copolymer rubber (C2-2).

Specific examples of the inorganic filler (C2-4) include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bulb and Shirasu balloon.

The inorganic filler (C2-4) is usually used in an amount of not more than 100 parts by mass, preferably 2 to 50 parts by mass, based on 100 parts by mass of the total amount of the crystalline polyolefin (C2-1) and the α-olefin-based copolymer rubber (C2-2).

[Crystalline Polyolefin (C2-1)]

The crystalline polyolefin (C2-1), which can constitute the olefin-based thermoplastic elastomer (C) according to the present invention, is a crystalline polymer obtained by polymerizing one or more α-olefins by high pressure method or low pressure method. As such a crystalline polyolefin, for example, an isotactic α-olefin polymer and a syndiotactic α-olefin polymer can be mentioned. These typical polymers are commercially available.

Specific examples of the α-olefin that constitutes the crystalline polyolefin (C2-1) include ethylene, propylene, 1-butene, 1-pentene, 1-hexene, 2-methyl-1-propene, 3-methyl-1-pentene, 4-methyl-1-pentene, 5-methyl-1-hexene, 1-octene and 1-decene. The crystalline polyolefin may be a homopolymer of the α-olefin, or a copolymer of two or more kinds of the α-olefins.

As the crystalline polyolefin resin (C2-1), particularly preferred is an isotactic polypropylene containing propylene in an amount of 70 mol % or more, preferably 80 mol % or more.

The crystalline polyolefin (C2-1) may be a random copolymer or a block copolymer.

The crystalline polyolefin (C2-1) usually has MFR (JIS K7210, 2.16 kg load, 230° C.) of 0.01 to 100 g/10 min, particularly preferably 0.05 to 50 g/10 min.

The crystalline polyolefin (C2-1) preferably has a melting point (Tm) as determined by DSC endothermic curve of 120 to 165° C., more preferably 130 to 160° C.

The crystalline polyolefin (C2-1) is usually used in an amount of 10 to 60 parts by mass, preferably 20 to 55 parts by mass, based on 100 parts by mass of the total amount of the crystalline polyolefin (C2-1) and the α-olefin-based copolymer rubber (C2-2).

[α-Olefin-Based Copolymer Rubber (C2-2)]

The α-olefin-based copolymer rubber (C2-2), which can constitute the olefin-based thermoplastic elastomer (C) according to the present invention, is preferably a rubber obtained by copolymerizing α-olefins having 2 to 20 carbon atoms, preferably α-olefins having 2 to 12 carbon atoms, optionally with a non-conjugated polyene, for example, a non-conjugated diene.

Specific examples of the α-olefins include ethylene, propylene, 1-butene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene.

As the α-olefin-based copolymer rubber (C2-2), one kind of the above α-olefin may be used singly, or a mixture of two or more kinds of the above α-olefins may be used. When a mixture of 4-methyl-1-pentene and another α-olefin is used, it is preferred that the molar ratio of another α-olefin to 4-methyl-1-pentene (another α-olefin/4-methyl-1-pentene) is within the range of 10/90 to 95/5.

Among the above α-olefins, particularly preferred are ethylene, propylene and 1-butene.

An example of the α-olefin-based copolymer rubber (C2-2) is a copolymer containing a structural unit derived from ethylene and a structural unit derived from an α-olefin having 3 or more carbon atoms, wherein the ratio of the structural unit derived from ethylene to the structural unit derived from an α-olefin having 3 or more carbon atoms, ethylene/α-olefin having 3 or more carbon atoms (molar ratio), is within the range of 40/60 to 95/5.

Specific examples of the non-conjugated polyene include dicyclopentadiene, 1,4-hexadiene, cyclooctadiene, methylenenorbornene, ethylidenenorbornene, 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 7-methyl-1,6-decadiene, 6-ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 9-methyl-1,8-undecadiene, 5-ethylidene-2-norbornene, 5-vinyl-2-norbornene, 4,8-dimethyl-1,4,8-decatriene and 4-ethylidene-8-methyl-1,7-nonadiene. Of these, particularly desired are 5-ethylidene-2-norbornene, 5-vinyl-2-norbornene, dicyclopentadiene, 4,8-dimethyl-1,4,8-decatriene (DMDT) and 4-ethylidene-8-methyl-1,7-nonadiene (EMND).

When the α-olefin-based copolymer rubber (C2-2) contains the non-conjugated polyene, for example, the non-conjugated diene as described above, one kind of the non-conjugated polyene may be used singly, or a mixture of two or more kinds of the non-conjugated polyenes may be used. Further, in addition to the non-conjugated polyene as described above, another copolymerizable monomer may be used in a range that is not detrimental to the object of the present invention.

When the α-olefin-based copolymer rubber (C2-2) has the non-conjugated polyene copolymerized therein, the content in the copolymer of the structural unit derived from the non-conjugated polyene is preferably 0.01 to 30 mol %, more preferably 0.1 to 20 mol %, particularly preferably 0.1 to 10 mol %, provided that the total amount of the structural units in the α-olefin-based copolymer rubber (C2-2) is 100 mol %.

The α-olefin-based copolymer rubber (C2-2) is preferably a copolymer of an α-olefin and a non-conjugated polyene. Particularly preferred is, for example, an ethylene/α-olefin having 3 or more carbon atoms/non-conjugated polyene copolymer, wherein the ratio of ethylene to an α-olefin having 3 or more carbon atoms, ethylene/α-olefin having 3 or more carbon atoms (molar ratio), is in the range of 40/60 to 95/5, and the copolymer contains a structural unit derived from the non-conjugated polyene in an amount of 0.01 to 30 mol %.

The α-olefin-based copolymer rubber (C2-2) usually has an intrinsic viscosity [η] as measured in a decalin solvent at 135° C. of 1.0 to 10.0 dl/g, preferably 1.5 to 7 dl/g. The melting point (Tm) as determined by DSC endothermic curve of the α-olefin-based copolymer rubber (C2-2), which is not particularly limited, is preferably absent or present at lower than 120° C.

The α-olefin-based copolymer rubber (C2-2) is used in an amount of 90 to 40 parts by mass, preferably 80 to 45 parts by mass, based on 100 parts by mass of the total amount of the crystalline polyolefin (C2-1) and the α-olefin-based copolymer rubber (C2-2).

The α-olefin-based copolymer rubber (C2-2) may be obtained by copolymerizing α-olefins having 2 to 20 carbon atoms optionally with a non-conjugated polyene in the presence of an olefin polymerization catalyst.

<Production Process of Olefin-Based Thermoplastic Elastomer (C)>

The olefin-based thermoplastic elastomer (C) according to the present invention may be obtained, for example, by dynamically heat-treating a mixture of the crystalline polyolefin (C2-1) and the α-olefin-based copolymer rubber (C2-2), optionally with the softener (C2-3) and/or the inorganic filler (C2-4) in the presence of an organic peroxide as described below thereby partially-crosslinking the mixture.

The "dynamically heat-treating" used herein means kneading at molten state. Specific example of the organic peroxide include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxyisopropyl carbonate, diacetyl peroxide, lauroyl peroxide and tert-butylcumyl peroxide.

Such an organic peroxide is used in an amount of 0.02 to 3 parts by mass, preferably 0.05 to 1 part by mass, based on 100 parts by mass of the whole of the substance to be treated, i.e., the crystalline polyolefin (C2-1) and the α-olefin-based copolymer rubber (C2-2). When the blending amount is in the above range, the resultant thermoplastic elastomer (C), by being appropriately crosslinked, has excellent properties such as heat resistance and moldability; and also has excellent properties such as tensile properties, elastic recovery properties and rebound properties in some cases.

In the partial-crosslinking treatment with the organic peroxide,
peroxy crosslinking assistants such as sulfur, p-quinonedioxime, p,p'-dibenzoylquinonedioxime and N-methyl-N, N'-m-phenylenedimaleimide;

polyfunctional methacrylate monomers such as divinylbenzene, triallyl cyanurate, ethylene glycol dimethacrylate, polyethylene glycol dimethacrylate, trimethylolpropane trimethacrylate and acryl methacrylate; and polyfunctional vinyl monomers such as vinyl butyrate and vinyl stearate may be added.

The use of the compounds described above such as the crosslining assistants is expected to allow the crosslinking reaction to proceed homogenously and mildly. The compounds such as the crosslinking assistants and the multifunctional vinyl monomers is usually used in an amount of not more than 2 parts by mass, more preferably 0.3 to 1 part by mass, based on 100 parts by mass of the whole substance to be treated.

In order to accelerate decomposition of the organic peroxide, a decomposition accelerator may be used, such as tertiary amines including triethylamine, tributylamine and 2,4,6-tri(dimethylamino)phenol, and naphthenic acid salts of aluminum, cobalt, vanadium, copper, calcium, zirconium, manganese, magnesium, lead, mercury or the like.

The dynamic heat treatment is preferably performed in a non-open type apparatus and is preferably performed in an atmosphere of an inert gas such as nitrogen or carbonic acid gas. The temperature of the heat treatment is preferably in the range of a melting point of the crystalline polyolefin (C2-1) to 300° C., more preferably 150 to 250° C., still more preferably 170 to 225° C. The kneading time is usually 1 to 20 minutes, preferably 1 to 10 minutes. The shear force applied is 10 to 100,000 $sec^{-1}$, preferably 100 to 50,000 $sec^{-1}$, in terms of shear rate.

As a kneading apparatus, a mixing roll, an intensive mixer (e.g., a Banbury mixer, a kneader), a monoaxial or biaxial extruder or the like may be used. The non-open type apparatus is preferable.

By the dynamic heat treatment as described above, the olefin-based thermoplastic elastomer (C) comprising the crystalline polyolefin (C2-1) and the α-olefin-based copolymer rubber (C2-2) or partially-crosslinked thereof is obtained.

The olefin-based thermoplastic elastomer (C) according to the present invention that has been partially-crosslinked contains a gel content, as measured by a method described below, of 20 wt % or more, preferably 20 to 99.5 wt %, particularly preferably 45 to 98 wt %. To measure a gel content, the following procedure may be taken. 100 mg of the olefin-based thermoplastic elastomer (C) is cut into a strip of 0.5 mm×0.5 mm×0.5 mm; the strip is immersed in a 30 mL of cyclohexane in a sealed container at 23° C. for 48 hours; and the strip is collected on a filter paper, and is allowed to dry at room temperature for 72 hours or longer until it has a constant weight.

From the weight of the dry residue, the weight of all the cyclohexane-insoluble components (inorganic fillers and the like) other than the polymer component, and the weight of the crystalline polyolefin (C2-1) in the sample before immersed in cyclohexane are subtracted to provide a "corrected final weight [y]".

On the other hand, the weight of the α-olefin-based copolymer rubber (C2-2) in the sample before immersed in cyclohexane is given as a "corrected initial weight [x]". Here, the gel content can be determined by the following equation.

Gel content [wt %]=(corrected final weight [y]/corrected initial weight [x])×100

The olefin-based thermoplastic elastomer (C) according to the present invention may have, for example, a melting point (Tm) as determined by DSC endothermic curve of 120 to 165° C., preferably 130 to 160° C.

<Styrene-Based Elastomer (D)>

The styrene-based elastomer (D), which is a polymer component that may be contained in the propylene-based polymer composition of the present invention, is not particularly limited as long as being an elastomer containing styrene as a polymer component. Styrene/diene-based thermoplastic elastomers, which are copolymers of a styrene-based component and a diene-based component, are preferable. Of them, particularly preferred are block copolymer elastomers and random copolymer elastomers. Here, examples of the styrene-based component include styrene, α-methylstyrene, p-methylstyrene, vinylxylene, vinylnaphthalene and mixtures thereof. Examples of the diene-based component include butadiene, isoprene, pentadiene, isobutylene and mixtures thereof.

Typical examples of the styrene-based elastomer (D) according to the present invention include, a hydrogenated diene-based polymer containing a polybutadiene block segment and a styrene-based compound (including styrene; this applies hereinafter)/butadiene copolymer block segment;

a hydrogenated diene-based polymer containing a polyisoprene block segment and a styrene-based compound/isoprene copolymer block segment;

a block copolymer containing a polymer block that mainly contains a styrene-based compound and a polymer block that mainly contains a conjugated diene compound;

a hydrogenated random copolymer of a styrene-based compound and a conjugated diene compound; and a hydrogenated block copolymer of a polymer block that mainly contains a styrene-based compound and a polymer block that mainly contains a conjugated diene compound.

The content of segments derived from the styrene-based component in the styrene-based thermoplastic elastomer (D) according to the present invention, which is not particularly limited, is preferably 5 to 40 wt % of the whole of the elastomer (D), particularly in view of flexibility and rubber elasticity.

One kind of the styrene-based elastomer (D) according to the present invention may be used, or two or more kinds of the styrene-based elastomer (D) according to the present invention may be combined. The styrene-based elastomer (D) may be a commercially-available product.

The MFR of the styrene-based elastomer (D) is not particularly limited as long as the propylene-based polymer composition obtained by containing the styrene-based elastomer (D) has molding processability, but the styrene-based elastomer (D) usually has MFR as measured at 230° C. under a load of 2.16 kg in accordance with JIS K-7210 of 0.01 to 100 g/10 min, preferably 0.01 to 50 g/10 min, more preferably 0.1 to 30 g/10 min, particularly preferably 0.1 to 10 g/10 min.

<Propylene/Ethylene/α-Olefin Having 4 to 20 Carbon Atoms Copolymer (E)>

The propylene/ethylene/α-olefin having 4 to 20 carbon atoms copolymer (E), which is a polymer component that may be contained in the propylene-based polymer composition of the present invention, is a copolymer of propylene, ethylene and an α-olefin having 4 to 20 carbon atoms that contains:

a structural unit derived from propylene in an amount of 40 to 85 mol %, preferably 60 to 82 mol %, more preferably 61 to 75 mol %;

a structural unit derived from ethylene in an amount of 5 to 30 mol %, preferably 8 to 15 mol %, more preferably 10 to 14 mol %;

a structural unit derived from an α-olefin having 4 to 20 carbon atoms in an amount of 5 to 30 mol %, preferably 10 to 25 mol %, more preferably 15 to 25 mol %, provided that the total amount of the structural unit derived from propylene, the structural unit derived from ethylene and the structural unit derived from an α-olefin having 4 to 20 carbon atoms is 100 mol %, and the total amount of the structural unit derived from ethylene and the structural unit derived from an α-olefin having 4 to 20 carbon atoms is preferably 60 to 15 mol %, wherein the isotactic triad fraction (mm fraction) as measured by $^{13}$C-NMR of the propylene/ethylene/α-olefin having 4 to 20 carbon atoms copolymer (E) is 85% or more, preferably 87% or more, more preferably 90% or more, and the upper limit of the mm fraction of the copolymer (E) is 100%, preferably 97.5%, more preferably 97%.

The α-olefin having 4 to 20 carbon atoms is preferably 1-butene

The MFR of the α-olefin copolymer (E) according to the present invention is not particularly limited as long as the propylene-based polymer composition obtained by containing the α-olefin copolymer (E) has molding processing, but the α-olefin copolymer (E) usually has MFR as measured at 230° C. under a load of 2.16 kg of 0.01 to 100 g/10 min, preferably 0.01 to 50 g/10 min, more preferably 0.1 to 30 g/10 min, particularly preferably 0.1 to 10 g/10 min.

The α-olefin copolymer (E) according to the present invention preferably has molecular weight distribution (Mw/Mn) as measured by gel permeation chromatography (GPC) of 1 to 3.

The α-olefin copolymer (E) according to the present invention preferably satisfies at least one of the following requirements (o) and (p), more preferably both of the following requirements (o) and (p).

(o) Shore A hardness is 30 to 80, preferably 35 to 60.

(p) Crystallinity as measured by X-ray diffraction is not higher than 20%, preferably not higher than 10%.

The α-olefin copolymer (E) according to the present invention preferably has a melting point Tm as measured by DSC of 50° C. or lower or has no melting point, particularly preferably has no melting point. In the present invention, a polymer having "no melting point" has a quantity of heat of fusion ΔH due to melting peak being not more than 1 J/g.

<Production Process of α-Olefin Copolymer (E)>

The α-olefin copolymer (E) according to the present invention may be produced, for example, by a method described in WO2004/087775.

<Isotactic Propylene-Based Polymer (F)>

The isotactic propylene-based polymer (F), which is a polymer component that may be contained in the propylene-based polymer composition of the present invention, is usually a propylene-based polymer that has an isotactic pentad fraction as measured by NMR of 0.85 or more, preferably 0.9 or more, more preferably 0.95 or more.

The isotactic pentad fraction (mmmm fraction) is measured and calculated by a method described in JP-A-2003-147135.

The isotactic propylene-based polymer (F) according to the present invention is a propylene homopolymer, or a copolymer of propylene and at least one α-olefin having 2 to 20 carbon atoms excluding propylene. Examples of the α-olefin having 2 to 20 carbon atoms excluding propylene include ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosene; ethylene or an α-olefin having 4 to 10 carbon atoms is preferable.

These α-olefins may form a random copolymer or a block copolymer with propylene.

The structural unit derived from these α-olefins may be contained in an amount of not more than 35 mol %, preferably not more than 30 mol %, in the copolymer (F). The amount of the structural unit derived from propylene is preferably 90 to 100 mol %. In the case of a copolymer, the amount of the structural unit derived from propylene is preferably 90 to 99 mol %, more preferably 92 to 98 mol % in the total amount of the structural unit derived from propylene and the structural unit derived from the α-olefins.

The isotactic propylene-based polymer (F) according to the present invention desirably has melt flow rate (MFR) as measured at 230° C. under a load of 2.16 kg in accordance with ASTM D 1238 of 0.01 to 1000 g/10 min, preferably 0.05 to 100 g/10 min.

As the isotactic propylene-based polymer (F) according to the present invention, as needed, a plurality of isotactic polypropylenes may be used in combination. For example, two or more kinds of components differing in melting point and rigidity may be used.

The isotactic propylene-based polymer (F) according to the present invention may be selected singly or in combination in view of desired properties from:

a propylene homopolymer or a propylene polymer containing not more than 3 mol % of a copolymerization component derived from an α-olefin excellent in heat resistance;

a block polypropylene excellent in the balance between heat resistance and flexibility (known polymer which usually has 3 to 30 wt % of a n-decane elutable rubber component); and a random copolymer of propylene and an α-olefin excellent in the balance between flexibility and transparency (known polymer that usually has a melting point as measured by DSC of 110 to 150° C.)

The isotactic propylene-based polymer (F) according to the present invention may be produced by polymerizing propylene or copolymerizing propylene and another α-olefin in a Ziegler catalyst system comprising e.g., a solid catalyst component containing magnesium, titanium, a halogen and an electron donor as an essential component, an organoaluminum compound and an electron donor, or in a metallocene system using a metallocene compound as a catalyst component.

<Ethylene/Vinyl Acetate Copolymer (G)>

The ethylene/vinyl acetate copolymer (G), which is a polymer component that may be contained in the propylene-based polymer composition of the present invention, in view of the compatibility with the propylene-based polymer (A) and the propylene-based copolymer (B), is usually a copolymer that contains 1 to 49 wt %, preferably 5 to 49 wt % of a unit derived from vinyl acetate. If the amount of the unit derived from vinyl acetate is excessively smaller than the above range, the effect of blending the ethylene/vinyl acetate copolymer is significantly reduced.

The ethylene/vinyl acetate copolymer (G) according to the present invention usually has MFR (JIS K-7210•1999, 190° C., 2.16 kg load) of 0.05 to 100 g/10 min, preferably 0.1 to 50 g/10 min. The ethylene/vinyl acetate copolymer (G), by having MFR in the above range, shows good fluidity and is readily blended with other components, and the resultant propylene-based polymer composition has excellent moldability, printing property, adhesion and thermal processability (welder processability).

<Ethylene-Based Polymer (H)>

The ethylene-based polymer, which is a polymer component that may be contained in the propylene-based polymer composition of the present invention, is an ethylene homopolymer or a copolymer containing ethylene as a main component and an α-olefin having 3 to 20 carbon atoms such as propylene, 1-butene, 1-pentene, 1-hexene, 1-octene 4-methyl-1-pentene, 3-methyl-1-pentene, 1 decene, 1-dodecene, 1-tetradecene, 1-hexadecene, 1-octadecene and 1-eicosene, the ethylene homopolymer or copolymer having a density of 850 to 930 kg/m$^3$, preferably 860 to 930 kg/m$^3$, more preferably 860 to 920 kg/m$^3$. The ethylene-based polymer (H) having a density in the above range can provide a flexible sheet/film. The ethylene-based polymer (H) according to the present invention, when being a copolymer, usually contains a unit derived from an α-olefin in an amount of 5 to 49 mol %, preferably in an amount of 5 to 30 mol %, more preferably in an amount of 5 to 25 mol %.

The ethylene-based polymer (H) according to the present invention usually has MFR (JIS K-7210•1999, 190° C., 2.16 kg load) of 0.05 to 100 g/10 min, preferably 0.5 to 100 g/10 min. The ethylene-based polymer (H), by having MFR in the above range, provides the propylene-based polymer composition having moldability and other properties that are excellent.

<Propylene-Based Polymer Composition>

The propylene-based polymer composition of the present invention is a composition that comprises:

the propylene-based polymer (A) in an amount of 1 to 35 parts by mass, preferably 2 to 20 parts by mass;

the propylene-based copolymer (B) in an amount of 5 to 95 parts by mass, preferably 10 to 85 parts by mass;

at least one of the olefin-based thermoplastic elastomer (C), the styrene-based elastomer (D), the α-olefin copolymer (E) and the isotactic propylene-based polymer (F), the components (C), (D) and (E) each being contained in an amount of 0 to 94 parts by mass, preferably 0 to 50 parts by mass, and the component (F) being contained in an amount of 0 to 49 parts by mass, preferably 0 to 45 parts by mass, more preferably 0 to 40 parts by mass, still more preferably 0 to 35 parts by mass, further preferably 0 to 30 parts by mass, particularly preferably 0 to 25 parts by mass; and the ethylene/vinyl acetate copolymer (G) and/or the ethylene-based polymer (H) in an amount of 0 to 60 parts by mass, preferably 0 to 50 parts by mass, the components from the olefin-based thermoplastic elastomer (C) to the ethylene-based polymer (H) being contained in a total amount of 1 to 94 parts by mass, preferably 13 to 88 parts by mass, provided that the total amount of the polymers (A) to (H) is 100 parts by mass.

Hereinafter, the respective polymers are also referred to simply as (A) to (H).

Examples of an embodiment in which the propylene-based polymer composition of the present invention contains three kinds of polymers include (A)+(B)+(C), (A)+(B)+(D), (A)+(B)+(E) and (A)+(B)+(F).

Examples of an embodiment in which the propylene-based polymer composition of the present invention contains four kinds of polymers include (A)+(B)+(C)+(D), (A)+(B)+(C)+(E), (A)+(B)+(C)+(F), (A)+(B)+(D)+(E), (A)+(B)+(D)+(F), (A)+(B)+(E)+(F), (A)+(B)+(C)+(G), (A)+(B)+(C)+(H), (A)+(B)+(D)+(G), (A)+(B)+(D)+(H), (A)+(B)+(E)+(G), (A)+(B)+(E)+(H), (A)+(B)+(F)+(G) and (A)+(B)+(F)+(H).

Examples of an embodiment in which the propylene-based polymer composition of the present invention contains five kinds of polymers include (A)+(B)+(C)+(D)+(E), (A)+(B)+(C)+(D)+(F), (A)+(B)+(C)+(E)+(F), (A)+(B)+(D)+(E)+(F), (A)+(B)+(C)+(G)+(H), (A)+(B)+(D)+(G)+(H), (A)+(B)+(E)+(G)+(H), (A)+(B)+(F)+(G)+(H), (A)+(B)+(C)+(D)+(G), (A)+(B)+(C)+(D)+(H), (A)+(B)+(C)+(E)+(G), (A)+(B)+(C)+(E)+(H), (A)+(B)+(C)+(F)+(G), (A)+(B)+(C)+(F)+(H), (A)+(B)+(D)+(E)+(G), (A)+(B)+(D)+(E)+(H), (A)+(B)+(D)+(F)+(G), (A)+(B)+(D)+(F)+(H), (A)+(B)+(E)+(F)+(G) and (A)+(B)+(E)+(F)+(H).

Examples of an embodiment in which the propylene-based polymer composition of the present invention contains six kinds of polymers include (A)+(B)+(C)+(D)+(E)+(F), (A)+(B)+(C)+(D)+(G)+(H), (A)+(B)+(C)+(E)+(G)+(H), (A)+(B)+(C)+(F)+(G)+(H), (A)+(B)+(D)+(E)+(G)+(H), (A)+(B)+(D)+(F)+(G)+(H), (A)+(B)+(C)+(E)+(F)+(H), (A)+(B)+(E)+(F)+(G)+(H), (A)+(B)+(C)+(D)+(E)+(G), (A)+(B)+(C)+(D)+(E)+(H), (A)+(B)+(C)+(D)+(F)+(G), (A)+(B)+(C)+(D)+(F)+(H), (A)+(B)+(D)+(E)+(F)+(G), (A)+(B)+(C)+(E)+(F)+(G) and (A)+(B)+(D)+(E)+(F)+(H).

Examples of an embodiment in which the propylene-based polymer composition of the present invention contains seven kinds of polymers include (A)+(B)+(C)+(D)+(E)+(G)+(H), (A)+(B)+(C)+(D)+(F)+(G)+(H), (A)+(B)+(D)+(E)+(F)+(G)+(H), (A)+(B)+(C)+(D)+(E)+(F)+(G), (A)+(B)+(C)+(E)+(F)+(G)+(H) and (A)+(B)+(C)+(D)+(E)+(F)+(H).

The propylene-based polymer composition of the present invention may contain all of the polymers from (A) to (H).

The propylene-based polymer composition of the present invention is not limited to the embodiments described above, and the respective polymers (A) to (H) may be two or more kinds of polymers.

The propylene-based polymer composition of the present invention, when containing at least one of (C), (D) and (E), in addition to (A) and (B), is excellent in flexibility and abrasion resistance. The propylene-based polymer composition of the present invention, particularly when containing at least one of (C) and (D), is further excellent in the balance between abrasion resistance and flexibility.

The propylene-based polymer composition of the present invention, when further containing (F), (G) or (H), makes it possible to appropriately control the flexibility of the propylene-based polymer composition.

Among the propylene-based polymer compositions of the present invention, exemplary compositions particularly excellent in the balance between flexibility and abrasion resistance contain (A) and (B), as well as component (s) selected from (C) to (H) as described below.

The exemplary selections are (C); (C) and (E); (C) and (H); (D); (D) and (E); (D) and (H); (C) and (D); (C), (D) and (E); and (C), (D) and (H). The exemplary selections, without being limited thereto, may further include (F) and/or (G), in order to further appropriately control the flexibility.

The resultant propylene-based polymer composition as described above, for example when being a press sheet having a thickness of 1 mm, has a Durometer A hardness as measured in accordance with JIS K7215 of not more than 70, preferably 40 to 70. Such a composition, having excellent abrasion resistance, is more preferred.

The reason why the propylene-based polymer composition of the present invention has flexibility but is excellent in abrasion resistance has not been determined but is considered to be as follows. Abrasion resistance is considered to be greatly affected by the compatibility of each component contained in a polymer composition. The propylene-based polymer composition of the present invention presumably adopts a structure in which dispersion phase with an appropriate size is dispersed in the matrix. As a result of this structure, in a morphology having phase separation where the diameter of the dispersion phase is small, abrasion loss attributed to interface peeling that arises at an interface of the dispersion phase hardly takes place.

In the present invention, the presumption that the diameter of the dispersion phase of the propylene-based polymer composition is small is supported by the finding that the haze value of a press sheet is relatively small. Indeed, haze is not determined solely by the compatibility but also is affected by the refractive index of each structural component, and thus some types of resins do not have clear correlation between haze and the diameter of dispersed particles; however such a correlation generally exists in many types of resins.

The propylene-based resin composition which provides a press sheet with 1 mm thickness that has a haze, as measured e.g., by a method described in Example of the present invention, of e.g., not more than 50%, tends to be further excellent in abrasion resistance.

The propylene-based polymer composition of the present invention, when containing (D) in addition to (A) and (B), desirably contains a component selected from (C), (E) (F) and (G) as another arbitral component.

In the propylene-based polymer composition of the present invention, the polymers (B), (C), (D), (E) and (H) contribute to the flexibility, and are desirably contained in a total amount of 30 parts by mass or more, more preferably 40 parts by mass or more, in 100 parts by mass of the total of (A) to (H).

In the propylene-based polymer composition of the present invention, the content of (A)+(B)+(C)+(E)+(F) is desirably 40 parts by mass or more, more preferably 50 parts by mass or more, still more preferably 60 parts by mass or more, in 100 parts by mass of the total of (A) to (H). The propylene-based polymer composition containing the above components in the above range is excellent in abrasion resistance, tends to be particularly good in transparency, too, and is considered to have further improved compatibility.

The propylene-based polymer composition of the present invention, when containing (G), more desirably contains a component selected from (C), (D), (E), (F) and (H) as a component other than (G) in terms of abrasion resistance. The propylene-based polymer composition of the present invention, when containing (D), more desirably contains a component selected from (C), (E), (F) and (G) as another arbitral component in terms of abrasion resistance.

Among the propylene-based polymer compositions of the present invention, a composition as represented by Example 7 containing (A)+(B)+(C)+(D), (A) in an amount of 1 to 15 parts by mass, (B) in an amount of 10 to 80 parts by mass, (C) in an amount of 10 to 50 parts by mass and (D) in an amount of 5 to 50 parts by mass, provided (A)+(B)+(C)+(D)=100 parts by mass, achieves both of flexibility and abrasion resistance.

Among the propylene-based polymer compositions of the present invention, a composition as represented by Example 10 containing (A)+(B)+(D)+(E)+(F), (A) in an amount of 1 to 15 parts by mass, (B) in an amount of 10 to 75 parts by mass, (D) in an amount of 10 to 50 parts by mass, (E) in an amount of 10 to 50 parts by mass and (F) in an amount of 1 to 40 parts by mass, provided (A)+(B)+(D)+(E)+(F)=100 parts by mass, achieves both of flexibility and abrasion resistance.

An example of a composition further excellent in flexibility, abrasion resistance and transparency is a composition containing (A) in an amount of 1 to 15 parts by mass, (B) in an amount of 10 to 75 parts by mass, (D) in an amount of 10 to 40 parts by mass, (E) in an amount of 10 to 50 parts by mass and (F) in an amount of 1 to 30 parts by mass, provided (A)+(B)+(D)+(E)+(F)=100 parts by mass. A more preferable example of the composition is a composition containing (A)

in an amount of 1 to 10 parts by mass, (B) in an amount of 15 to 60 parts by mass, (D) in an amount of 10 to 40 parts by mass, (E) in an amount of 10 to 40 parts by mass and (F) in an amount of 1 to 15 parts by mass, provided (A)+(B)+(D)+(E)+(F)=100 parts by mass.

Among the propylene-based polymer compositions of the present invention, a composition as represented by Example 5 containing (A)+(B)+(D)+(F), (A) in an amount of 1 to 15 parts by mass, (B) in an amount of 10 to 80 parts by mass, (D) in an amount of 10 to 50 parts by mass and (F) in an amount of 5 to 40 parts by mass, provided (A)+(B)+(D)+(F)=100 parts by mass, has excellent abrasion resistance.

The composition containing a larger content of the component (F) tends to have higher softening temperature and be excellent in heat resistance.

Among the propylene-based polymer compositions of the present invention, a composition as represented by Example 4 containing (A)+(B)+(C)+(E)+(F), (A) in an amount of 1 to 15 parts by mass, (B) in an amount of 10 to 65 parts by mass, (C) in an amount of 10 to 50 parts by mass, (E) in an amount of 10 to 50 parts by mass and (F) in an amount of 10 to 40 parts by mass, provided (A)+(B)+(C)+(E)+(F)=100 parts by mass, shows excellent abrasion resistance and is excellent in transparency, and therefore is employable for uses requiring transparency.

The composition containing a larger content of the component (E) tends to have higher softening temperature and be excellent in heat resistance.

Among the propylene-based polymer compositions of the present invention, a composition as represented by Example 3 containing (A)+(B)+(C)+(H), (A) in an amount of 1 to 15 parts by mass, (B) in an amount of 10 to 80 parts by mass, (C) in an amount of 10 to 50 parts by mass and (H) in an amount of 5 to 50 parts by mass, provided (A)+(B)+(C)+(H)=100 parts by mass, shows excellent flexibility and abrasion resistance and is excellent in transparency, too, and therefore is employable for uses requiring transparency.

Among the propylene-based polymer compositions of the present invention, a composition as represented by Example 11 containing (A)+(B)+(E)+(F)+(H), (A) in an amount of 1 to 15 parts by mass, (B) in an amount of 10 to 80 parts by mass, (E) in an amount of 10 to 50 parts by mass, (F) in an amount of 1 to 40 parts by mass and (H) in an amount of 5 to 50 parts by mass, provided (A)+(B)+(E)+(F)+(H)=100 parts by mass, shows excellent abrasion resistance and is excellent in transparency, too, and therefore is employable for uses requiring transparency.

Among the propylene-based polymer compositions of the present invention, a composition as represented by Example 6 containing (A)+(B)+(D)+(H), (A) in an amount of 1 to 15 parts by mass, (B) in an amount of 10 to 80 parts by mass, (D) in an amount of 10 to 50 parts by mass and (H) in an amount of 5 to 50 parts by mass, provided (A)+(B)+(D)+(H)=100 parts by mass, achieves excellent flexibility and abrasion resistance.

The propylene-based polymer composition of the present invention usually has MFR as measured at 230° C. under a load of 2.16 kg in accordance with JIS K-7210 of 0.01 to 50 g/10 min, preferably 0.01 to 30 g/10 min.

The propylene-based polymer composition of the present invention may be produced using each component described above in the above range by various known methods such as a mixing method using a Henschel mixer, a V-blender, a ribbon blender, a tumbler blender or the like, and a method comprising mixing each component and thereafter melt-kneading with a monoaxial extruder, a biaxial extruder, a kneader, a Banbury mixer or the like, followed by granulating or pulverizing.

The propylene-based polymer composition of the present invention may contain additives as needed, such as inorganic fillers, nucleating agents, antioxidants, flame retardants, antistatic agents, pigments, dyes and anticorrosives.

Typical examples of the inorganic fillers include calcium carbonate, talc, glass fiber, magnesium carbonate, mica, kaolin, calcium sulfate, barium sulfate, titanium white, white carbon, carbon black, aluminum hydroxide, aluminum oxide, magnesium hydroxide, silica, clay and zeolite. These may be used singly or two or more kinds may be combined.

When the propylene-based polymer composition of the present invention contains the inorganic filler, the inorganic filler may be added in an amount of 0.1 to 300 parts by mass, preferably 1 to 250 parts by mass, more preferably 100 to 200 parts by mass, based on 100 parts by mass of the propylene-based polymer composition.

Typical examples of the nucleating agents include sodium benzoate, bisbenzylidenesorbitol, bis(p-methylbenzylidene) sorbitol, bis(p-ethylbenzylidene) sorbitol, sodium-2,2-methylenebis(4,6-di-t-butylphenyl)phosphite, talc, titanium oxide and aluminumhydroxy-di-p-t-butylbenzoate. These may be used singly or two or more kinds may be combined.

Typical examples of the antioxidants include phenol-based antioxidants such as pentaerythrityl-tetrakis[3-(3,5-di-t-butyl-4-hydroxyphenyl)propionate] and triethyleneglycol-bis [3-(3-t-butyl-5-methyl-4-hydroxyphenyl)propionate]; phosphorus-based antioxidants such as tris(monononylphenyl) phosphite and tris(2,4-di-t-butylphenyl)phosphite; and sulfur-based antioxidants such as dilaurylthiodipropionate. These may be used singly or two or more kinds may be combined.

Typical examples of the flame retardants include magnesium hydroxide, calcium hydroxide and phosphorus-based compounds. These may be used singly or two or more kinds may be combined.

When the additives as described above are added to the propylene-based polymer composition of the present invention, after the blending of the above additives, the mixture may be kneaded with a common kneader such as a roll, a Banbury mixer, a monoaxial extruder and a biaxial extruder to prepare a composition. Preferably, the composition is usually in the form of pellets.

<Uses of Propylene-Based Polymer Composition>

The propylene-based polymer composition of the present invention is widely applicable for known uses of polyolefins. For example, the propylene-based polymer composition can be used to form articles with various shapes such as sheets, unstretched or stretched films and filaments.

Examples of the articles include those obtained by known thermal molding methods such as calendar molding, extrusion molding, injection molding, inflation molding, blow molding, extrusion blow molding, injection blow molding, press molding, vacuum molding and foam molding.

Hereinafter, the article is described with reference to several examples. The article according to the present invention, for example when being a calendar-molded article, is not particularly limited in terms of its shape and its product type. Examples thereof include a sheet, a film (unstretched), a pipe, a hose, a wire coating and a filament, with particularly preferred articles including a sheet, a film and a filament.

When the propylene-based polymer composition of the present invention is extrusion-molded, known extrusion apparatus and molding conditions are adoptable. For example, using a monoaxial screw extruder, a kneading extruder, a ram extruder, a gear extruder or the like, a molten propylene-based polymer composition of the present invention may be extruded through e.g., a T-die to form a sheet, a film (unstretched) or the like.

<Sheet Forming>

The propylene-based polymer composition of the present invention is suited particularly for the formation of a sheet (in general, an article with a larger thickness is called a sheet and an article with a smaller thickness is called a film, but these are collectively called a "sheet" in the present invention). The sheet forming process using the propylene-based polymer composition of the present invention includes:

(Step 1): step of heat-melting the propylene-based polymer composition; and (Step 2): step of forming the heat-molten propylene-based polymer composition into a sheet.

The process may include, between (Step 1) and (Step 2), a step of kneading the heat-molten propylene-based polymer composition.

<Calendar Molding>

The propylene-based polymer composition of the present invention is suited particularly for calendar molding. The calendar molding process using the propylene-based polymer composition of the present invention includes:

(Step 1): step of heat-melting the propylene-based polymer composition, and (Step 2-1): step of forming a sheet by calendering.

The process may include, between (Step 1) and (Step 2-1), a step of kneading the heat-molten propylene-based polymer composition.

The (Step 2) may include (Step 2-2): step of simultaneously sheet-forming and laminating with a base material described later by calendering to provide a laminate.

<Formation of Artificial Leather>

The artificial leather is preferably formed, for example, through (Step 2-1): step of forming a sheet by calendering, or through (Step 2-2): step of simultaneously sheet-forming and laminating with a base material described later by calendering to provide a laminate. The sheet obtained through (Step 1) and (Step 2) may be taken off and laminated with a base material separately.

The process for producing a sheet or a laminate of the present invention may include, at an appropriate stage, an embossing step of applying patterns on the sheet or the laminate by a method such as thermal fusion bonding and needle punching.

Specifically, the sheet of the present invention may be directly embossed; or an embossed sheet may be laminated with a base material to produce a laminate; or a laminate obtained may be embossed.

<Laminate>

The sheet obtained from the propylene-based polymer composition of the present invention may be laminated with various known base materials according to uses.

Examples of the base materials capable of being laminated include woven fabric, knitted fabrics, nonwoven fabrics and grain layers, composed of at least one of synthetic fibers, natural fibers inorganic fibers and mixtures of these fibers.

Examples of the synthetic fibers include those composed of polypropylene, polyethylene, polyesters, nylons, acryls, polyurethanes, polyvinyl chloride, silicone or the like.

Examples of the natural fibers include cotton, hemp, silk and wool.

Examples of the inorganic fibers include glass fibers and carbon fibers.

Examples of the woven fabrics include fabrics and knitted fabrics made of fiber materials. Examples of the nonwoven fabrics include webs formed by entangling fiber materials by a chemical method, a mechanical method or a method combining these methods.

An example of the base material that can be laminated is a foam such as a foamed sheet.

Examples of the foam are those composed of urethane, polyolefins such as polyethylene and polypropylene and polystyrene.

<Artificial Leather>

The propylene-based polymer composition of the present invention is employable as artificial leathers. The artificial leathers are employable in the field including automobiles (including two-wheel vehicles), sports, home electrical appliances, stationery, sundries, furniture, cloths, horticulture and building materials.

Specific uses include, without being limited thereto, automotive components such as floor materials, ceiling materials, instrument panels, door trims, interior sheets and seat leathers, seat bags, bicycle saddles, deck boards, floor mats, anti-slip mats, sheets for leisure, gaskets, water-proof sheets, chair skins, bags, school bags, shoes for track and field, marathon shoes, shoes for running, basketball shoes, tennis shoes, golf shoes, walking shoes, jumpers, coats, safety wear, gloves, ski wear, cold weather mountain-climbing wear, bands, sashes, ribbons, mobile phone straps, switch plates, jackets, name tags, golf bags, watch belts, bag grips, golf club grips, boots, notebook covers, book covers, key holders, ashtray cases, cigarette cases, handheld cases, pen cases, pen grips, wallets, business card holders, commuter-pass holders, front and back faces of tatami mats, wall papers, shoulder bag straps, sandals, slippers, boats, waterbeds, tent cloths, albums, address book covers, nursing goods (bed covers), baseballs, basketballs, handballs, dodge balls, table cloths, accordion curtains, illumination equipment, stuffed toys, mats, desk covers, frames, harnesses, belts, hats, parachutes, kayaks, sofas, cushion covers, ball skins, mouse pads, emblems, badges, bracelets, necklaces, storage boxes, sheets for greenhouse, wardrobes, tables and tissue paper boxes.

In terms of excellent abrasion resistance, scratch resistance and the like and also in terms of water resistance, weight reduction, good recycling property, particularly preferred uses are, for example, automotive interior components such as floor materials, ceiling materials, instrument panels, door trims, interior sheets and seat leathers.

In terms of water resistance, lightness, no-odor and no color-migration, particularly preferred uses are, for example, mats, front and back faces of tatami mats and sports goods such as running shoes, mountain-climbing boots, balls, kayaks and ski wear.

EXAMPLES

Hereinafter, the present invention is more specifically described based on examples without limiting the present invention.

In Examples and Comparative Examples, property values were measured by methods described below.

(1) MFR

MFR was measured in accordance with JIS K-7210 (1999). The measurement was performed at 230° C., under a load of 2.16 kg for (A), (B), (D), (E) and (F); at 230° C. under a load of 10 kg for (C); at 190° C. under a load of 2.16 kg for (G) and (H).

(2) Density ($kg/m^3$)

Using a product pellet as a sample, the density was measured with a density gradient tube.

(3) Intrinsic Viscosity [η] (dl/g)

The intrinsic viscosity was measured with a decalin solvent at 135° C. Specifically, a polymerization powder, a pellet or a resin block in an amount of about 20 mg was dissolved in 15 mL of decalin, and the specific viscosity $\eta_{sp}$ of this decalin solution was measured in a 135° C. oil bath. This decalin solution was diluted by adding 5 mL of a decalin solvent thereto, and the specific viscosity $\eta_{sp}$ thereof was measured similarly. The diluting operation was repeated twice further and $\eta_{sp}/C$ when the concentration (C) of the solute was extrapolated to 0 was determined as an intrinsic viscosity (see the following equation).

$$[\eta]=lim(\eta_{sp}/C)(C\rightarrow 0)$$

(4) Molecular Weight Distribution (Mw/Mn)

The molecular weight distribution (Mw/Mn) was measured using a gel permeation chromatograph Alliance GPC-2000 manufactured by Waters, as follows. Two columns of TSKgel GNH6-HT, and two columns of TSKgel GNH6-HTL, each having an inner diameter of 7.5 mm and a length of 300 mm, were used as a separation column; the column temperature was 140° C.; the mobile phase was composed of o-dichlorobenzene (Wako Pure Chemical Industries, Ltd.) and 0.025% by weight of BHT (dibutylhydroxytoluene, Takeda Pharmaceutical Company Limited.) as an antioxidant and was moved at 1.0 mL/min; the sample concentration was 15 mg/10 mL; the injection amount of the sample was 500 μL; and a differential refractometer was used as a detector. With regard to standard polystyrenes, for those having a molecular weight of Mw<1000 and Mw>4×10$^6$, those manufactured by Tosoh Corporation were used; and for those having a molecular weight of 1000≤Mw≤4×10$^6$, those manufactured by Pressure Chemical Company were used.

(5) Contents of Ethylene, Propylene and α-Olefin in Each Polymer

The contents of ethylene, propylene and an α-olefin were measured with JNM GX-400 NMR measurement apparatus manufactured by JEOL, ltd., as follows. 0.35 g of a sample was dissolved in 2.0 mL of hexachlorobutadiene with heating; the resultant solution was filtered through a glass filter (G2), and the filtrate, to which 0.5 mL of deuterated benzene was added, was introduced to a NMR tube of 10 mm in internal diameter and subjected to $^{13}$C-NMR measurement at 120° C., with an accumulation of 8,000 or more times. From the resultant $^{13}$C-NMR spectrum, the composition of ethylene, propylene and an α-olefin was quantified.

(6) Stereoregularity (rrrr Fraction and rr Fraction)

The stereoregularity was quantified by $^{13}$C-NMR measurement under the same conditions as described above.

The syndiotactic pentad fraction (rrrr fraction) was determined from Prrrr (absorption intensity assigned to the methyl group of the third unit in a site where five continuous propylene units are syndiotactically bonded) and Pw (absorption intensity assigned to all the methyl groups of propylene units), in $^{13}$C-NMR spectrum, using the following equation (1).

$$rrrr\ fraction(\%)=100\times Prrrr/Pw \quad (1)$$

The syndiotactic triad fraction (rr fraction) was determined from Prr (absorption intensity assigned to the methyl group of the second unit in a site where three continuous propylene units are syndiotactically bonded) and Pw (absorption intensity assigned to all the methyl groups of propylene units), in $^{13}$C-NMR spectrum, using the following equation (4).

$$rr\ fraction(\%)=100\times Prr/Pw \quad (4)$$

(7) mmmm Fraction

The mmmm fraction was measured by a method described in JP-A-2003-147135.

(8) Melting Point (Tm) and Quantity of Heat of Fusion (ΔH) (J/g)

DSC manufactured by Seiko Instruments Inc. was used. In an aluminum pan for measurement, about 5 mg of a sample was placed, and the sample was heated at 50° C./min to 230° C., held at 230° C. for 5 min, and then cooled at 10° C./min to −100° C. and held for 5 min. The sample was then heated at 10° C./min to 200° C. From an endothermic curve obtained in the final heating, a melting point (Tm) and a quantity of heat of fusion (ΔH) were determined.

(9) Internal Haze

As a sample for internal haze measurement, using a hydraulic heat pressing machine manufactured by Shindo Kinzoku Co., Ltd., set at 200° C., a sheet having a thickness of 1 mm was formed from the propylene-based polymer composition. At this time, preheating was carried out for about 5 to 7 min, and then pressurization was carried out at 10 MPa for 1 to 2 minutes. Then, using another hydraulic heat pressing machine manufactured by Shindo Kinzoku Co., Ltd., set at 20° C., compression was carried out at 10 MPa, which was followed by cooling for about 5 min. Thereby, a sample for measurement was prepared. As a heating plate, a brass plate with a thickness of 5 mm was used.

The resultant press sheet was allowed to stand still at 23° C. for 24 hours for its status adjustment and used for measurement. As a haze meter, NDH2000 manufactured by NIPPON DENSHOKU INDUSTRIES, CO., LTD. was used. The measurement was performed in cyclohexanol using a light source C at 23° C. by measurement method A in accordance with JIS K-7105.

(10) Durometer A Hardness

As a sample, the press sheet prepared by the same method described in the above item (9) followed by its status adjustment was used to measure its Durometer A hardness in accordance with JIS K-7215 at a retention time of 5 sec.

(11) Softening Temperature

As a sample, the press sheet having a thickness of 1 mm prepared by the method described in the above item (9) followed by its status adjustment was used to measure its softening temperature in accordance with JIS K-7206.

(12) Abrasion Resistance (Taber Abrasion Test)

As a sample, the press sheet obtained after its status adjustment was used. The abrasion loss was measured in accordance with JIS K-7204 at 23° C., abrading ring: H-22, rotation rate; 60 times/min (60 rpm), the number of rotation: 500 times, load: 1000 g.

Polymers used in Examples and Comparative Examples are shown below.

(A) Propylene-Based Polymer (A-1)

To a sufficiently nitrogen-purged 500 mL glass autoclave, 250 mL of toluene was introduced, and propylene was flown in an amount of 150 L/h and was kept at 25° C. for 20 min. On the other hand, in a sufficiently nitrogen-purged 30 mL side-arm flask, a magnetic stirrer was put, and to the flask, 5.00 mmol of a toluene solution of methylaluminoxane (Al=1.53 mol/L), and then 5.0 μmol of a toluene solution of dibenzylmethylene (cyclopentadienyl) (3,6-di-tert-butylfluorenyl) zirconiumdichloride were added and stirred for 20 minutes. This solution was added to the toluene-having glass autoclave to which propylene had been flown, to thereby initiate polymerization. While continuously feeding a propylene gas in an amount of 150 L/h, polymerization was performed under ordinary pressure at 25° C. for 45 min. Then, a slight amount of methanol was added to terminate the polymerization. The polymer solution was added to an excess of methanol to precipitate the polymer, and the polymer was dried under reduced pressure at 80° C. for 12 hours. As a result, 2.38 g of the polymer was obtained. The polymerization activity was 0.63 kg-PP/mmol-Zr·hr. The resultant propylene homopolymer (A-1) had an intrinsic viscosity [η] of 1.9 dl/g, Tm of 158° C. (Tm1=152° C., Tm2=158° C.), a pentad fraction (rrrr fraction) of 93.5%, a quantity of heat of fusion ($\Delta H_c$) of 57 J/g, Mw/Mn of 2.0 and MFR (JIS K6721, 230° C., 2.16 kg load) of 6.0 g/10 min.

(B) Propylene/Ethylene/1-Butene Copolymer (B-1)

To a sufficiently nitrogen-purged 2000 mL polymerization apparatus, 833 mL of dry hexane, 120 g of 1-butene and triisobutylaluminum (1.0 mmol) were introduced at room temperature. Then, the temperature of the mixture in the polymerization apparatus was elevated to 60° C. The pressure inside the system was increased with propylene so as to be 0.33 MPa, and the pressure inside the system was controlled with ethylene so as to be 0.63 MPa. Subsequently, a toluene solution in which 0.002 mmol of di(p-chlorophenyl)methylene (cyclopentadienyl)(octamethyl octahydrodibenzofluorenyl)zirconiumdichloride was contacted with 0.6 mmol in terms of aluminum of methylaluminoxane (manufactured by Tosoh FineChem Corporation) was added to the polymerization apparatus. With the temperature of the mixture kept at 60° C. and the pressure inside the system kept at 0.63 MPa with ethylene, polymerization was performed for 20 min. By adding 20 mL of methanol, the polymerization was terminated. After depressurization, from the polymer solution, the polymer was precipitated in 2 L of methanol, and the polymer was vacuum dried at 130° C. for 12 hours. The propylene/ethylene/1-butene copolymer (B-1) was obtained in an amount of 97 g, had an intrinsic viscosity [η] as measured in 135° C. decalin of 2.3 (dl/g), and MFR (JIS K6721, 230° C., 2.16 kg load) of 1.3 g/10 min. It was thus clear that in the equation (2) (requirement (b4)), a value in the left side: $1.50 \times (1.3)^{(-0.20)} = 1.42$, and a value in the right side: $2.65 \times (1.3)^{(-0.20)} = 2.51$, and therefore the copolymer (B-1) satisfied the equation (2). The copolymer (B-1) had a glass transition point as determined by DSC of -23.8° C., and a quantity of heat of fusion ($\Delta H_B$) of not more than 1 J/g.

The propylene/ethylene/1-butene copolymer (B-1) had the following composition: a structural unit derived from propylene: 62 mol %, a structural unit derived from ethylene: 10 mol % and a structural unit derived from 1-butene: 28 mol %.

(C) Olefin-Based Thermoplastic Elastomer (C-1)

A partially-crosslinked olefin-based thermoplastic elastomer (manufactured by Mitsui Chemicals Inc., product name: MILASTOMER™ 5030NS) (MFR as measured at a temperature of 230° C. under a load of 10 kg: 25 g/10 min, Durometer A hardness: 52) was used.

(D) Styrene-Based Elastomer (D-1)

A styrene-based block copolymer elastomer (manufactured by Asahi Kasei Corporation, product name: Tuftec™ H1221) (MFR as measured at a temperature of 230° C. under a load of 2.16 kg: 4.5 g/10 min, Durometer A hardness: 42) was used.

(E) Propylene/Ethylene/α-Olefin Having 4 to 20 Carbon Atoms Copolymer (E-1)

To a sufficiently nitrogen-purged 2000 mL polymerization apparatus, 917 mL of dry hexane, 85 g of 1-butene and triisobutylaluminum (1.0 mmol) were introduced at room temperature. Then, the temperature of the mixture in the polymerization apparatus was elevated to 65° C. The pressure inside the system was increased with propylene so as to be 0.77 MPa, and the pressure inside the system was controlled with ethylene so as to be 0.78 MPa. Subsequently, a toluene solution in which 0.002 mmol of dimethyl methylene (3-tert-butyl-5-methylcyclopentadienyl)fluorenylzirconiumdichloride was contacted with 0.6 mmol in terms of aluminum of methylaluminoxane (manufactured by Tosoh FineChem Corporation) was added to the polymerization apparatus. With the temperature of the mixture kept at 65° C. and the pressure inside the system kept at 0.78 MPa with ethylene, polymerization was performed for 20 min. By adding 20 mL of methanol, the polymerization was terminated. After depressurization, from the polymer solution, the polymer was precipitated in 2 L of methanol, and the polymer was vacuum dried at 130° C. for 12 hours. The copolymer was obtained in an amount of 60.4 g. The propylene/ethylene/α-olefin having 4 to 20 carbon atoms copolymer obtained was a propylene/ethylene/1-butene copolymer that had an ethylene content of 14.0 mol %, a 1-butene content of 19 mol %, MFR of 7 g/10 min, [η] of 2.0, had no melting point observed (ΔH: less than 0.5 J/g), molecular weight distribution (Mw/Mn) of 2.0, Shore A hardness of 45 and mm fraction of 92%.

(F) Isotactic Propylene-Based Polymer (1) Propylene/Ethylene Random Copolymer (F-1)

Propylene content: 95.5 mol %, Ethylene content: 4.5 mol %, mmmm fraction: 97.5% or more, Melting point: 146° C., MFR as measured at 230° C. under a load of 2.16 kg: 30 g/10 min.

(2) Propylene/Ethylene Random Copolymer (F-2)

Propylene content: 97.0 mol %, Ethylene content: 3.0 mol %, mmmm fraction: 97.50 or more, Melting point: 149° C., MFR as measured at 230° C. under a load of 2.16 kg: 20 g/10 min.

The stereoregularity (mmmm) of the propylene/ethylene random copolymer (F-1) and the propylene/ethylene random copolymer (F-2) was determined by $^{13}$C-NMR spectrum analysis.

(G) Ethylene/Vinyl Acetate Copolymer (G-1)

Ethylene/vinyl acetate copolymer (manufactured by DUPONT-MITSUI POLYCHEMICALS CO., LTD., product name: Evaflex™ EV360) (Vinyl acetate content: 25% by mass, MFR as measured at 190° C. under a load of 2.16 kg: 2 g/10 min, Durometer A hardness: 86)

(H) Ethylene-Based Polymer (H-1)

Ethylene/1-butene random copolymer (manufactured by MITSUI CHEMICALS, INC., product name: TAFMER™ A4085) (Density: 885 kg/m$^3$, MFR as measured at 190° C. under a load of 2.16 kg: 3.6 g/10 min)

Examples 1 to 12 and Comparative Examples 1 and 2

Each polymer was weighed in an amount indicated in Table 1 and Table 2. With respect to 100 parts by weight of a mixture of each polymer, 0.2 part by weight of 3,5-di-t-butyl-4-hydroxytoluene as antioxidant was blended, and the resultant mixture was melt-kneaded and granulated using a biaxial extruder at a resin temperature of 200° C., to provide a propylene-based polymer composition.

Properties of the resultant propylene-based polymer composition were measured by the methods described above. The results are set forth in Tables 1 and 2.

TABLE 1

| Compositional polymer | Example 1 | Example 2 | Example 3 | Example 4 | Example 5 | Example 6 | Example 7 |
|---|---|---|---|---|---|---|---|
| (A-1): part by mass | 2.25 | 2.25 | 7.5 | 2.25 | 7.5 | 7.5 | 7.5 |
| (B-1): part by mass | 12.75 | 12.75 | 42.5 | 12.75 | 42.5 | 42.5 | 42.5 |
| (C-1): part by mass | 10 | | 25 | 15 | | | 25 |
| (D-1): part by mass | | | | | 25 | 25 | 25 |
| (E-1): part by mass | | 8.5 | | 40 | | | |
| (F-1): part by mass | 25 | 26.5 | | | 25 | | |
| (F-2): part by mass | | | | 30 | | | |
| (G-1): part by mass | | | | | | | |
| (H-1): part by mass | 50 | 50 | 25 | | | 25 | |
| Internal haze (%) | 91.9 | 87.4 | 25.5 | 34.6 | 45.7 | 49.9 | 48.1 |
| A hardness | 82.0 | 85.0 | 65.0 | 84.0 | 86.0 | 66.0 | 63.0 |
| Softening temperature [° C.] | 125.5 | 125.7 | 106.1 | 127.4 | 130.0 | 103.2 | 109.9 |
| Taber abrasion loss [mg] | 145.8 | 127.5 | 54.5 | 49.6 | 47.1 | 64.5 | 19.1 |

TABLE 2

| Compositional polymer | Example 8 | Example 9 | Example 10 | Example 11 | Example 12 | Comp. Example 1 | Comp. Example 2 |
|---|---|---|---|---|---|---|---|
| (A-1): part by mass | 7.5 | 7.5 | 7.5 | 7.5 | 6 | | |
| (B-1): part by mass | 42.5 | 42.5 | 42.5 | 42.5 | 34 | | |
| (C-1): part by mass | | | | | | 25 | |
| (D-1): part by mass | 25 | | 25 | | 40 | 50 | 50 |
| (E-1): part by mass | | 20 | 20 | 20 | 16 | | |
| (F-1): part by mass | | | | | | | |
| (F-2): part by mass | | 5 | 5 | 5 | 4 | | |
| (G-1): part by mass | 25 | 25 | | | | | 25 |
| (H-1): part by mass | | | | 25 | | 25 | 25 |
| Internal haze (%) | 58.9 | 67.0 | 47.8 | 2.9 | 27 | 89.2 | 82.2 |
| A hardness | 72.0 | 79.0 | 69.0 | 73.0 | 55 | 39.0 | 50.0 |
| Softening temperature [° C.] | 103.9 | 103.7 | 106.6 | 104.7 | 111 | 86.7 | 78.2 |
| Taber abrasion loss [mg] | 137.7 | 67.0 | 35.8 | 54.5 | 23 | 181.0 | 216.9 |

What is claimed is:

1. An artificial leather comprising a sheet or a film that comprises a propylene-based polymer composition comprising the following polymers:

1 to 35 parts by mass of a propylene-based polymer (A) having a syndiotactic pentad fraction (rrrr fraction) as measured by $^{13}$C-NMR of 85% or more and containing 90 to 100 mol % of a structural unit derived from propylene; and 5 to 95 parts by mass of a propylene-based copolymer (B) containing 40 to 89 mol % of a structural unit derived from propylene and 11 to 60 mol % of a structural unit derived from an α-olefin having 2 to 20 carbon atoms and satisfying the following requirement (b4):

(b4) the intrinsic viscosity [η] (dl/g) as measured in decalin at 135° C. and the MFR (g/10 min) as measured at 230° C. under a load of 2.16 kg satisfy the following equation:

$$1.50 \times MFR^{(-0.20)} \leq [\eta] \leq 2.65 \times MFR^{(-0.20)};$$

wherein the propylene-based polymer composition comprises, in addition to (A) and (B), at least one of the following polymers (C) to (F), and optionally comprises a polymer (G) and/or a polymer (H) in a range described below, wherein the total amount of the polymers (C) to (H) is 1 to 94 parts by mass, provided that the total amount of the polymers (A) to (H) is 100 parts by mass:

0 to 94 parts by mass of a non-crosslinked or partially-crosslinked olefin-based thermoplastic elastomer (C);

5 to 50 parts by mass of a styrene-based block copolymer elastomer (D);

0 to 94 parts by mass of a propylene/ethylene/α-olefin having 4 to 20 carbon atoms copolymer (E) containing 40 to 85 mol % of a structural unit derived from propylene, 5 to 30 mol % of a structural unit derived from ethylene and 5 to 30 mol % of a structural unit derived from an α-olefin having 4 to 20 carbon atoms, wherein the isotactic triad fraction (mm fraction) of the propylene/ethylene/α-olefin having 4 to 20 carbon atoms copolymer (E) is 85% or more;

0 to 49 parts by mass of an isotactic propylene-based polymer (F);

0 to 60 parts by mass of an ethylene/vinyl acetate copolymer (G); and 0 to 60 parts by mass of an ethylene-based polymer (H) having a density of 850 to 930 kg/m$^3$.

2. The artificial leather according to claim 1, wherein the propylene-based polymer composition comprises at least one polymer of the polymers (C) to (F).

3. The artificial leather according to claim 1, wherein the propylene-based polymer composition comprises at least one polymer of the polymers (D) to (E).

4. The artificial leather according to claim 1, wherein the propylene-based polymer composition comprises the polymer (D) and further comprises at least one polymer selected from the group consisting of the polymer (C), the polymer (F), the polymer (F) and the polymer (G).

5. The artificial leather according to claim 1, wherein the propylene-based polymer composition comprises the polymer (E) and the polymer (F).

6. The artificial leather according to claim 1, wherein the propylene-based polymer composition comprises (A) in an amount of 1 to 15 parts by mass, (B) in an amount of 10 to 80 parts by mass, (C) in an amount of 10 to 50 parts by mass and (D) in an amount of 5 to 50 parts by mass, provided (A)+(B)+(C)+(D)=100 parts by mass.

7. The artificial leather according to claim 1, wherein the propylene-based polymer composition comprises (A) in an amount of 1 to 15 parts by mass, (B) in an amount of 10 to 75 parts by mass, (D) in an amount of 10 to 50 parts by mass, (E) in an amount of 10 to 50 parts by mass and (F) in an amount of 1 to 40 parts by mass, provided (A)+(B)+(D)+(E)+(F)=100 parts by mass.

8. The artificial leather according to claim 1, wherein the propylene-based polymer composition comprises (A) in an amount of 1 to 15 parts by mass, (B) in an amount of 10 to 80 parts by mass, (D) in an amount of 10 to 50 parts by mass and (F) in an amount of 5 to 40 parts by mass, provided (A)+(B)+(D)+(F)=100 parts by mass.

9. The artificial leather according to claim 1, wherein the propylene-based polymer composition comprises (A) in an amount of 1 to 15 parts by mass, (B) in an amount of 10 to 65 parts by mass, (C) in an amount of 10 to 50 parts by mass, (E) in an amount of 10 to 50 parts by mass and (F) in an amount of 10 to 40 parts by mass, provided (A)+(B)+(C)+(E)+(F)=100 parts by mass.

10. The artificial leather according to claim 1, wherein the propylene-based polymer composition comprises (A) in an amount of 1 to 15 parts by mass, (B) in an amount of 10 to 80 parts by mass, (C) in an amount of 10 to 50 parts by mass and (H) in an amount of 5 to 50 parts by mass, provided (A)+(B)+(C)+(H)=100 parts by mass.

11. The artificial leather according to claim 1, wherein the propylene-based polymer composition comprises (A) in an amount of 1 to 15 parts by mass, (B) in an amount of 10 to 80 parts by mass, (E) in an amount of 10 to 50 parts by mass, (F) in an amount of 1 to 40 parts by mass and (H) in an amount of 5 to 50 parts by mass, provided (A)+(B)+(E)+(F)+(H)=100 parts by mass.

12. The artificial leather according to claim 1, wherein the propylene-based polymer composition comprises (A) in an amount of 1 to 15 parts by mass, (B) in an amount of 10 to 80 parts by mass, (D) in an amount of 10 to 50 parts by mass and (H) in an amount of 5 to 50 parts by mass, provided (A)+(B)+(D)+(H)=100 parts by mass.

13. The artificial leather according to claim 1, wherein when being a press sheet having a thickness of 1 mm, the propylene-based polymer composition has a Durometer A hardness as measured in accordance with JIS K-7215 of not more than 70.

14. The artificial leather according to claim 1, wherein a press sheet having a thickness of 1 mm of the propylene-based polymer composition has an internal haze as measured in accordance with JIS K-7105 of not more than 50%.

15. A propylene-based polymer composition comprising the following polymers:
1 to 35 parts by mass of a propylene-based polymer (A) having a syndiotactic pentad fraction (rrrr fraction) as measured by $^{13}$C-NMR of 85% or more and containing 90 to 100 mol % of a structural unit derived from propylene; and
5 to 95 parts by mass of a propylene-based copolymer (B) containing 40 to 89 mol % of a structural unit derived from propylene and 11 to 60 mol % of a structural unit derived from an α-olefin having 2 to 20 carbon atoms and satisfying the following requirement (b4):

(b4) the intrinsic viscosity [η] (dl/g) as measured in decalin at 135° C. and the MFR as measured at 230° C. under a load of 2.16 kg satisfy the following equation:

$$1.50 \times MFR^{(-0.20)} \leq [\eta] \leq 2.65 \times MFR^{(-0.20)};$$

wherein the propylene-based polymer composition comprises, in addition to (A) and (B), at least one of the following polymers (C) to (F), and optionally comprises a polymer (G) and/or a polymer (H) in a range described below, wherein the total amount of the polymers (C) to (H) is 1 to 94 parts by mass, provided that the total amount of the polymers (A) to (H) is 100 parts by mass:
0 to 94 parts by mass of a non-crosslinked or partially-crosslinked olefin-based thermoplastic elastomer (C);
5 to 50 parts by mass of a styrene-based block copolymer elastomer (D);
0 to 94 parts by mass of a propylene/ethylene/α-olefin having 4 to 20 carbon atoms copolymer (E) containing 40 to 85 mol % of a structural unit derived from propylene, 5 to 30 mol % of a structural unit derived from ethylene and 5 to 30 mol % of a structural unit derived from an α-olefin having 4 to 20 carbon atoms, wherein the isotactic triad fraction (mm fraction) of the propylene/ethylene/α-olefin having 4 to 20 carbon atoms copolymer (E) is 85% or more;
0 to 49 parts by mass of an isotactic propylene-based polymer (F);
0 to 60 parts by mass of an ethylene/vinyl acetate copolymer (G); and
0 to 60 parts by mass of an ethylene-based polymer (H) having a density of 850 to 930 kg/m$^3$.

16. The propylene-based polymer composition according to claim 15, which comprises at least one polymer of the polymers (C) to (E).

17. The propylene-based polymer composition according to claim 15, which comprises at least one polymer of the polymers (D) to (E).

18. The propylene-based polymer composition according to claim 15, which comprises the polymer (D) and further comprises at least one polymer selected from the group consisting of the polymer (C), the polymer (E), the polymer (F) and the polymer (G).

19. The propylene-based polymer composition according to claim 15, which comprises the polymer (E) and the polymer (F).

20. The propylene-based polymer composition according to claim 15, which comprises (A) in an amount of 1 to 15 parts by mass, (B) in an amount of 10 to 80 parts by mass, (C) in an amount of 10 to 50 parts by mass and (D) in an amount of 5 to 50 parts by mass, provided (A)+(B)+(C)+(D)=100 parts by mass.

21. The propylene-based polymer composition according to claim 15, which comprises (A) in an amount of 1 to 15 parts by mass, (B) in an amount of 10 to 75 parts by mass, (D) in an amount of 10 to 50 parts by mass, (E) in an amount of 10 to 50 parts by mass and (F) in an amount of 1 to 40 parts by mass, provided (A)+(B)+(D)+(E)+(F)=100 parts by mass.

22. The propylene-based polymer composition according to claim 15, which comprises (A) in an amount of 1 to 15 parts by mass, (B) in an amount of 10 to 80 parts by mass, (D) in an amount of 10 to 50 parts by mass and (F) in an amount of 5 to 40 parts by mass, provided (A)+(B)+(D)+(F)=100 parts by mass.

23. The propylene-based polymer composition according to claim 15, which comprises (A) in an amount of 1 to 15 parts by mass, (B) in an amount of 10 to 65 parts by mass, (C) in an amount of 10 to 50 parts by mass, (E) in an amount of 10 to 50 parts by mass and (F) in an amount of 10 to 40 parts by mass, provided (A)+(B)+(C)+(E)+(F)=100 parts by mass.

24. The propylene-based polymer composition according to claim 15, which comprises (A) in an amount of 1 to 15 parts by mass, (B) in an amount of 10 to 80 parts by mass, (C) in an amount of 10 to 50 parts by mass and (H) in an amount of 5 to 50 parts by mass, provided (A)+(B)+(C)+(H)=100 parts by mass.

25. The propylene-based polymer composition according to claim 15, which comprises (A) in an amount of 1 to 15 parts by mass, (B) in an amount of 10 to 80 parts by mass, (E) in an amount of 10 to 50 parts by mass, (F) in an amount of 1 to 40 parts by mass and (H) in an amount of 5 to 50 parts by mass, provided (A)±(B)+(E)+(F)+(H)=100 parts by mass.

26. The propylene-based polymer composition according to claim 15, which comprises (A) in an amount of 1 to 15 parts by mass, (B) in an amount of 10 to 80 parts by mass, (D) in an amount of 10 to 50 parts by mass and (H) in an amount of 5 to 50 parts by mass, provided (A)+(B)+(D)+(H)=100 parts by mass.

27. The propylene-based polymer composition according to claim 15, wherein when being a press sheet having a thickness of 1 mm, the propylene-based polymer composition has a Durometer A hardness as measured in accordance with JIS K-7215 of not more than 70.

28. The propylene-based polymer composition according to claim 15, wherein a press sheet having a thickness of 1 mm of the propylene-based polymer composition has an internal haze as measured in accordance with JIS K-7105 of not more than 50%.

* * * * *